United States Patent
Blackmoon

(10) Patent No.: US 12,484,492 B2
(45) Date of Patent: Dec. 2, 2025

(54) WEED PREVENTION DEVICE

(71) Applicant: Frank Blackmoon, Saint Cloud, FL (US)

(72) Inventor: Frank Blackmoon, Saint Cloud, FL (US)

( * ) Notice: Subject to any disclaimer, the term of this patent is extended or adjusted under 35 U.S.C. 154(b) by 275 days.

(21) Appl. No.: 18/239,415

(22) Filed: Aug. 29, 2023

(65) Prior Publication Data

US 2025/0072338 A1    Mar. 6, 2025

(51) Int. Cl.
*A01G 13/38*    (2025.01)
*E04H 17/00*    (2006.01)

(52) U.S. Cl.
CPC ........... *A01G 13/38* (2025.01); *E04H 17/006* (2021.01)

(58) Field of Classification Search
CPC ...... A01G 13/27; A01G 13/38; E04H 17/006; E04H 17/063; E01F 9/00; E04F 15/141; E04F 15/02183
See application file for complete search history.

(56) References Cited

U.S. PATENT DOCUMENTS

| | | | | |
|---|---|---|---|---|
| 5,369,925 A | * | 12/1994 | Vargo | E04H 12/2292 211/183 |
| 5,622,356 A | * | 4/1997 | Duggan | E04H 12/2292 52/170 |
| 5,685,522 A | * | 11/1997 | Randolph, Jr. | E04H 17/063 52/170 |
| 7,104,514 B2 | * | 9/2006 | Ciarlo | B65G 1/02 52/244 |
| D610,718 S | * | 2/2010 | Ringus | D25/133 |
| D621,965 S | * | 8/2010 | Ringus | D25/133 |
| D669,197 S | * | 10/2012 | Connor | D25/133 |
| 9,556,637 B1 | * | 1/2017 | Martins | E01F 9/00 |
| 12,320,138 B1 | * | 6/2025 | Fischer | B21D 5/006 |
| 2010/0200823 A1 | * | 8/2010 | Ringus | E04H 17/063 256/1 |
| 2021/0396040 A1 | | 12/2021 | Hanna et al. | |
| 2024/0172604 A1 | * | 5/2024 | Nellis | A01G 13/27 |

* cited by examiner

*Primary Examiner* — Daniel J Wiley
(74) *Attorney, Agent, or Firm* — Jason T. Daniel, Esq.; Daniel Law Offices, P.A.

(57) ABSTRACT

A weed prevention device includes a main body having a front wall, a pair of angular side walls, a pair of rear walls, and a recessed center section. The recessed center section includes a square shape for engaging a privacy fence post, and each of the rear walls extend outward from the back end of the recessed section. Each of the angular side walls and top walls extend diagonally backward from the front wall to terminate along the distal ends of the rear walls. A plurality of holes is provided to receive screws for securing the main body onto the fence post. Serrations in the front wall permit the main body to be separated into two halves each having a mirror image to the other. The two halves being independently securable onto one side of a fence post.

7 Claims, 4 Drawing Sheets

WEED PREVENTION DEVICE

TECHNICAL FIELD

The present invention relates generally to weed prevention products, and more particularly to a weed prevention device for use with privacy fence posts.

BACKGROUND

The statements in this section merely provide background information related to the present disclosure and may not constitute prior art.

Fences are commonly used at or along the property boundaries as a means for containing animals and/or for providing privacy to a home occupant. Although there are many different types of fences such as iron or chain link, many residential properties prefer to construct privacy fences. In this regard, privacy fences are typically constructed from wood or plastic, and have a plurality of spaced-apart posts that are connected by a series of horizontal frame members. Each of the frame members support a plurality of fence panels which form a solid or semi-solid barrier that obstructs viewing.

Privacy fences typically have a front side wherein only the fence panels are visible, and a back side where the fence posts and frame members are visible. In many jurisdictions, it is required that property owners must position the front side of the fence to face outward (e.g., away from the property) and the back side of the fence to face inward.

Once constructed, it is common for tall grass, weeds and other undesirable vegetation to grow along the bottom portions of the fence. Many times, such items can be easily removed using a string trimmer along the entirety of the front side of the fence. Unfortunately, due to the protruding nature of the posts along the back side, it is difficult for string trimmers to remove weeds that grow in the space between the vertical posts and the fence panels. As such, homeowners and landscapers must often resort to manually pulling these weeds which incurs a significant amount of labor and/or must utilize weed killing chemicals which are costly and typically not environmentally friendly.

Accordingly, it would be beneficial to provide a weed prevention device which can be positioned along a fence post to overcome the drawbacks noted above.

SUMMARY OF THE INVENTION

The present invention is directed to a weed prevention device for securement to a fence post. One embodiment of the present invention can include a main body having a front wall, a pair of angular side walls, a pair of rear walls, and a recessed center section. The recessed center section can include a square shape that is complementary to a shape of a privacy fence post, and each of the rear walls can extend outward from a back end of the recessed section. Each of the angular side walls can extend diagonally backward from the front wall to terminate along the distal ends of the rear walls. A pair of top walls can extend along the upper edges of the main body and can extend outward from the recessed center section along each half of the main body.

A pair of securement tabs can extend outward from the rear walls, and a plurality of holes can be located in the securement tabs and the front wall. Each of the holes can receive connectors such as screws, for example, to secure the device to the fence post and a frame and fence panels. When secured onto a privacy fence post, the top walls prevent organic growth along the sides of the post, and the angled side sections allow circular trimmers to remove weeds.

In one embodiment, the front wall includes serrations for allowing the main body to be separated into two halves each having a mirror image to the other. The two halves can be independently secured onto one side of a fence post.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
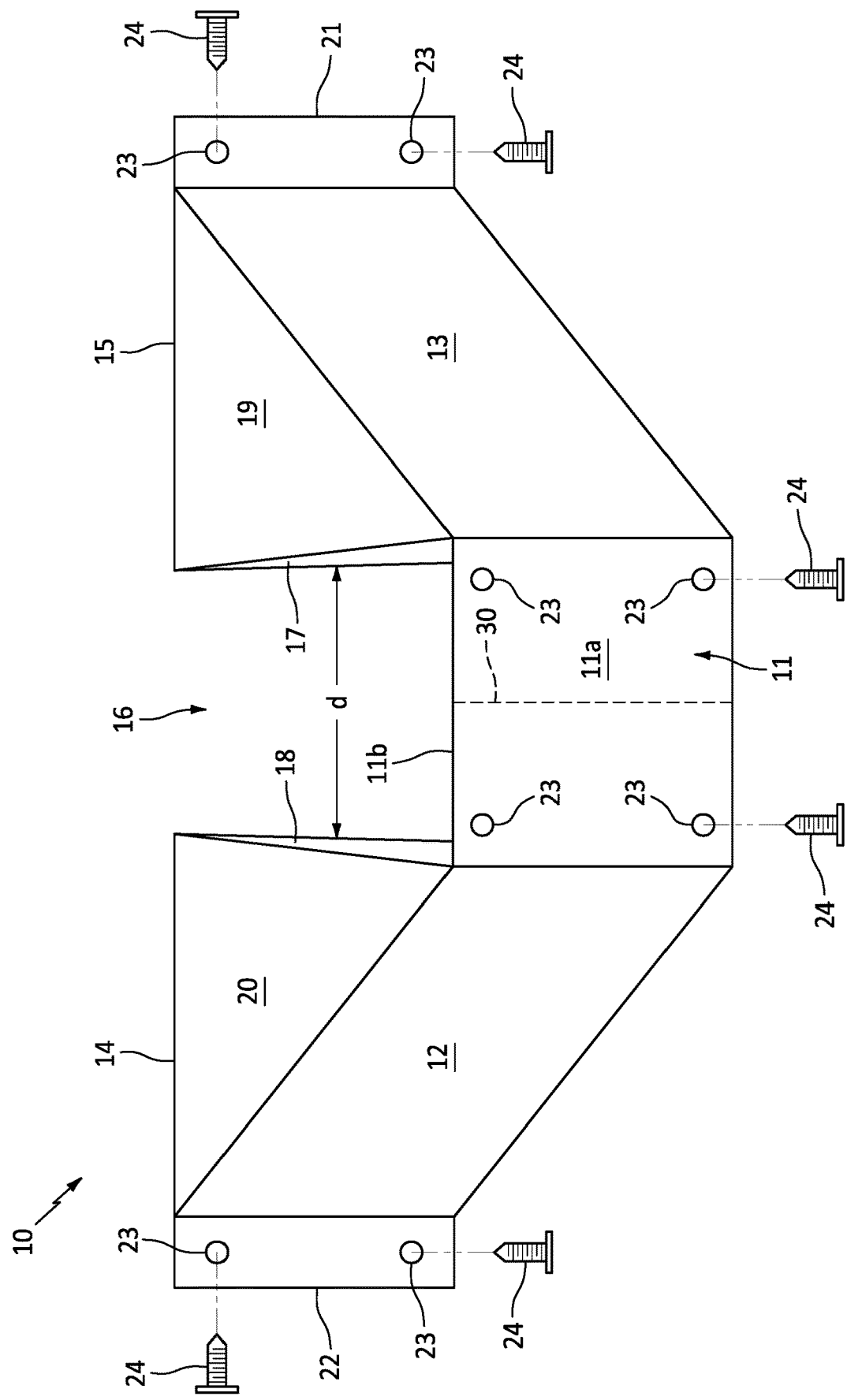
FIG. 1 is a perspective view of a weed prevention device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, flexible strips of interlocking projections with a slider (i.e., zipper), thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-4 illustrate one embodiment of a weed prevention device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, one embodiment of the weed prevention device 10 can include a main body having a front wall 11 with a front facing surface 11a, a rear facing surface 11b, angled side walls 12 and 13, rear walls 14 and 15 and a recessed center section 16 that is defined by walls 17, 18 and 11b. Additionally, top wall 19 can extend from the top edges of walls 13, 15 and 17, respectively, and top wall 20 can extend from the top edges of walls 12, 14 and 18, respectively.

Bottom walls (not illustrated) may be provided opposite to walls 19 and 20, or the bottom walls may be omitted such that the device body is relatively hollow. In either instance, walls 17, 18 and 11 will preferably be arranged at 90-degree angles relative to each other, and will include a separation distance d of 4" 5" or 6" so as to form a square shaped opening that is complementary in shape and size to the most commonly sized commercially available privacy fence posts. Of course, other shapes and sizes are also contemplated.

In one embodiment, a pair of securement tabs 21 and 22 can extend outward from the outer edges of rear walls 15 and 14, respectively. Additionally, a plurality of holes or indentions 23 can be positioned along both of the securement tabs 21 and 22, and the front panel 11. Each of the holes can receive connectors 24 such as screws, for example, which can secure the device onto the fence. Of course, any number of other connectors may be provided to permanently or removably secure the device onto a fence. Likewise, the securement tabs may be located at other locations such as extending from the top edges of the device so as to engage fence components at other positions.

As described herein, the main body may be formed from any number of different materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), malleable polyethylene terephthalate (PET)), and/or various composite materials, for example.

Figure 2:
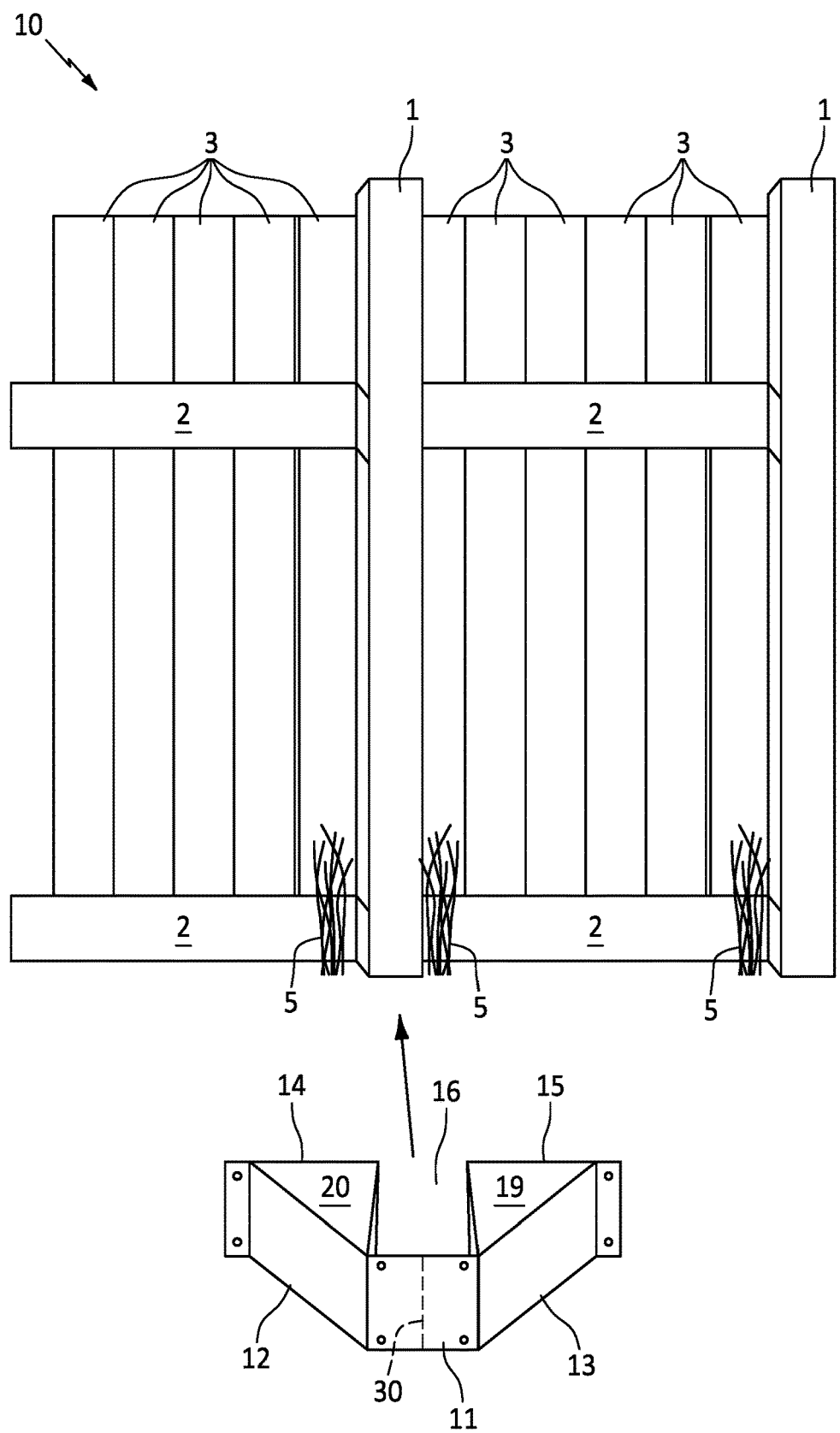
FIG. 2 is a perspective view of the weed prevention device in operation, in accordance with one embodiment of the invention.
Figure 3:
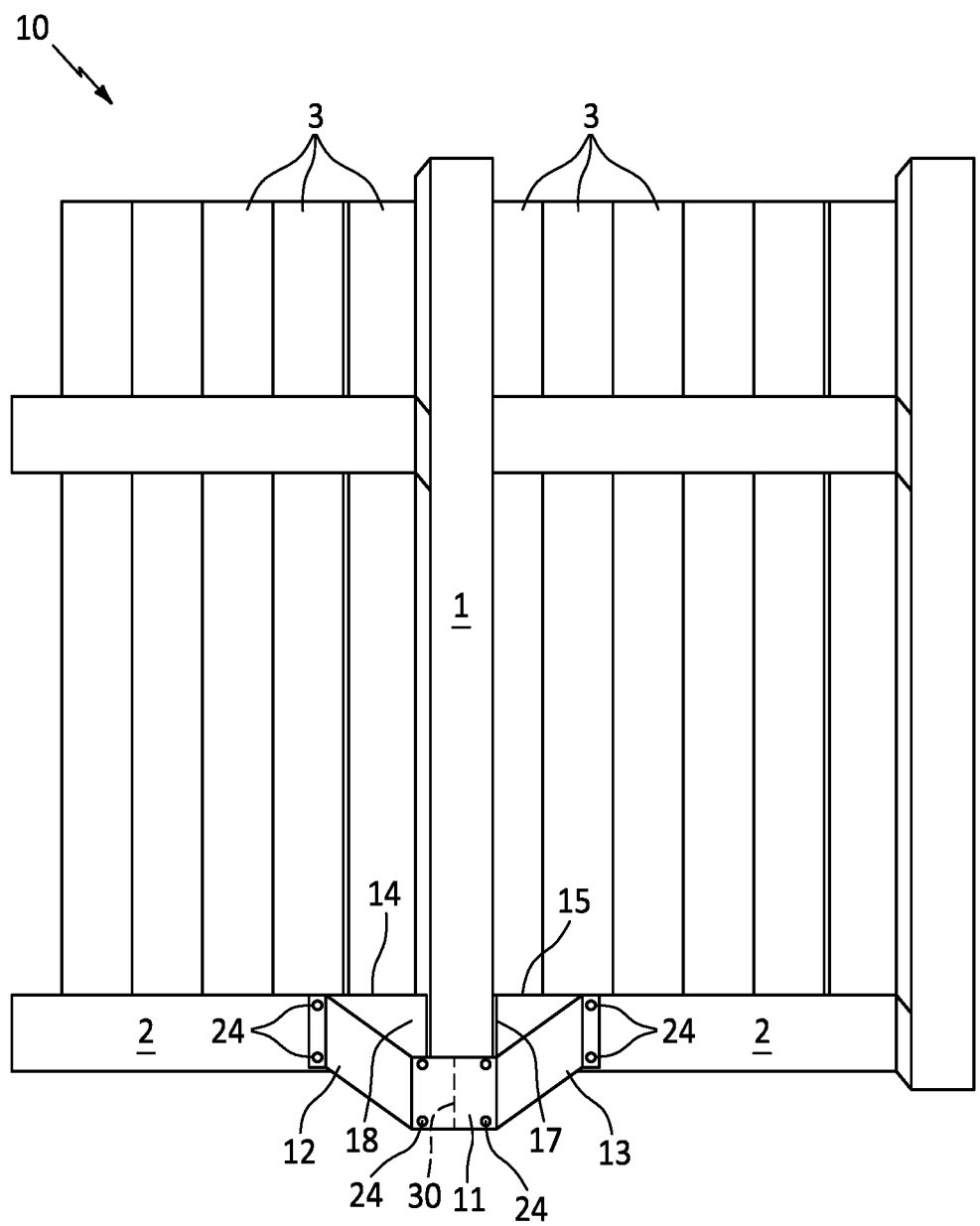
FIG. 3 is another perspective view of the weed prevention device in operation, in accordance with one embodiment of the invention.

As shown best at FIGS. 2 and 3, the recessed center section 16 can receive and engage a vertical fence post 1, so as to position the rear walls 14 and 15 directly against either the horizontal frame 2 or the fence panels 3 adjacent to the post. When so positioned, the angled side walls 12 and 13 which are preferably angled θ about 45 to 60 degrees relative to the rear walls 14 and 15, respectively, will extend diagonally back from the fence post to the frame or panels, thereby eliminating the corner area where weeds 5 grow. By providing an enclosed area due to top walls 19 and 20, sunlight will not reach the sides of the posts and organic material will no longer grow in this area.

Moreover, the diagonal arrangement of the side walls is ideal for allowing a string trimmer to engage the entire front and side facing surfaces of the device 10 in addition to the fence panels in order to remove all weeds from growing along the fence and post area. Of course, any number of other angles are also contemplated.

In one embodiment, the center portion of the front wall 11 can include a plurality of serrations 30 that extend through the wall. The serrations can be provided to allow a user to easily bend the device in order to separate the wall 11 into two equal sections 11a1 and 11a2, each having an inside edge 31 and 32, respectively.

Figure 4:
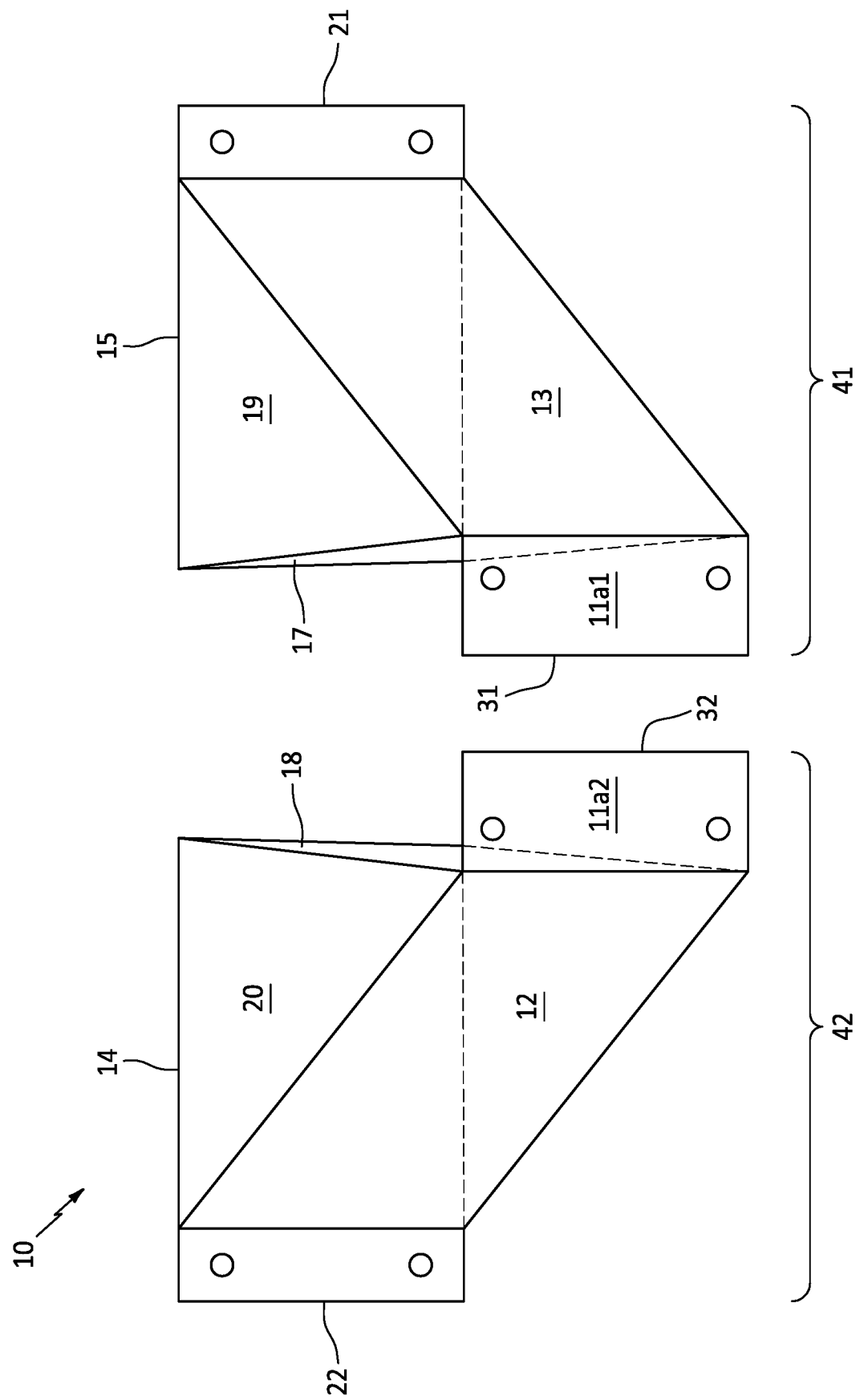
FIG. 4 is another perspective view of the weed prevention device, in accordance with one embodiment of the invention.

As shown best in FIG. 4, when the front wall is separated, the device body forms two individual components 41 and 42 that are mirror image to each other. The two components comprising triangular members that can be used individually to selectively engage the left or right half of a fence post. Such a feature is particularly advantageous for use with posts that are located along the end of a fence and/or where one side of the post supports a gate or other such component.

Accordingly, the above-described device functions to engage both sides of a fence post as a single integrated unit or as separate components in order to prevent weeds and other substances from accumulating along a fence post which are difficult to remove using traditional approaches.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A weed prevention device for securement onto a fence post, said device comprising:
   a main body having
      a front wall,
      a first angular side wall,
      a second angular side wall,
      a first inner wall,
      a second inner wall,
      a first rear wall,
      a second rear wall,
      a recessed center section;
   a first top wall extending from an upper edge of the first angular sidewall and from the first inner wall, the second top wall positioned substantially horizontally,
   a second top wall extending from an upper edge of the second angular sidewall and from the first inner wall, the second top wall positioned substantially horizontally,
   a first plurality of holes that are positioned along the front wall;
   a first plurality of connectors that are configured to secure the front wall to a fence post via the first plurality of holes;
   a pair of securement tabs that extend outward from the first rear wall and the second rear wall, each of the securement tabs including a second plurality of holes; and
   a second plurality of connectors that are configured to secure the pair of securement tabs to a horizontal fence frame via the second plurality of holes,
   wherein the first rear wall and the second rear wall are configured to engage the horizontal fence frame, and the recessed center section includes a square shape and is configured to receive the fence post.

2. The device of claim 1, wherein the first rear wall includes an inside edge that is adjacent to the recessed center section and an outside edge that extends outward therefrom, and
   wherein the second rear wall includes an inside edge that is adjacent to the recessed center section and an outside edge that extends outward therefrom.

3. The device of claim 2, wherein the first angular side wall extends from the front wall to the outside edge of the first rear wall, and the second angular side wall extends from the front wall to the outside edge of the second rear wall.

4. The device of claim 3, wherein the first angular side wall is positioned at an angle between 45 degrees and 60 degrees relative to the first rear wall, and the second angular side wall is positioned at an angle between 45 degrees and 60 degrees relative to the second rear wall.

5. The device of claim 4, wherein the first rear wall and the second rear wall are positioned against one of the fence frame or a fence panel adjacent to the fence post when the recessed center section is engaged with the fence post.

6. The device of claim 1, wherein each of the first plurality of connectors and the second plurality of connectors comprise a plurality of threaded screws.

7. The device of claim 1, wherein the main body is constructed from at least one of a plastic, or a metal material.

* * * * *